United States Patent
Luo et al.

(10) Patent No.: US 10,827,374 B2
(45) Date of Patent: Nov. 3, 2020

(54) RESOURCE MANAGEMENT INDICATION METHOD AND APPARATUS WITH FLEXIBLE MANNER OF MEASUREMENT

(71) Applicant: HUAWEI TECHNOLOGIES CO., LTD., Guangdong (CN)

(72) Inventors: Jun Luo, Shanghai (CN); Yalin Liu, Shenzhen (CN); Jin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/366,679

(22) Filed: Mar. 27, 2019

(65) Prior Publication Data

US 2019/0223041 A1 Jul. 18, 2019

Related U.S. Application Data

(63) Continuation of application No. PCT/CN2017/097560, filed on Aug. 15, 2017.

(30) Foreign Application Priority Data

Sep. 28, 2016 (CN) .......................... 2016 1 0864901

(51) Int. Cl.
*H04W 24/10* (2009.01)
*H04W 72/12* (2009.01)
(Continued)

(52) U.S. Cl.
CPC ........... *H04W 24/10* (2013.01); *H04W 24/02* (2013.01); *H04W 24/08* (2013.01); *H04W 72/1268* (2013.01); *H04W 72/1289* (2013.01)

(58) Field of Classification Search
CPC ..... H04W 24/10; H04W 24/02; H04W 24/08; H04W 72/1268; H04W 72/1289
See application file for complete search history.

(56) References Cited

U.S. PATENT DOCUMENTS

| | | | | |
|---|---|---|---|---|
| 8,441,951 B2 * | 5/2013 | Kazmi | ................ | H04W 24/10 370/252 |
| 8,892,091 B2 * | 11/2014 | Schmidt | ................ | H04W 68/00 455/423 |

(Continued)

FOREIGN PATENT DOCUMENTS

| | | |
|---|---|---|
| CN | 102638840 A | 8/2012 |
| CN | 103107873 A | 5/2013 |

(Continued)

OTHER PUBLICATIONS

3GPP Ts 36.331 V13.1.0 (Mar. 2016); "3rd Generation Partnership Project; Technical Specification Group Radio Access Network; Evolved Universal Terrestrial Radio Access (E-UTRA); Radio Resource Control (RRC); Protocol specification" (Release 13), total 551 pages.

(Continued)

*Primary Examiner* — Mounir Moutaouakil
(74) *Attorney, Agent, or Firm* — Leydig, Voit & Mayer, Ltd.

(57) ABSTRACT

Embodiments of this application provide a resource management indication method and apparatus. The method includes: generating, by a base station, radio resource management RRM measurement manner indication information, where the RRM measurement manner indication information is used to indicate an RRM measurement manner; and sending, by the base station, the RRM measurement manner indication information to a terminal. In the embodiments of this application, the base station can flexibly indicate the RRM measurement manner to the terminal, so that a more proper RRM measurement manner is used, to improve measurement efficiency and reduce measurement overheads.

20 Claims, 6 Drawing Sheets

(51) Int. Cl.
*H04W 24/08* (2009.01)
*H04W 24/02* (2009.01)

(56) References Cited

U.S. PATENT DOCUMENTS

| | | | | |
|---|---|---|---|---|
| 9,398,483 | B2* | 7/2016 | Behravan | H04B 7/0632 |
| 9,794,014 | B2* | 10/2017 | Seo | H04W 16/10 |
| 9,872,244 | B2* | 1/2018 | Yi | H04W 48/20 |
| 9,973,243 | B2* | 5/2018 | Zhang | H04L 5/0051 |
| 9,979,456 | B1* | 5/2018 | Akoum | H04L 5/0048 |
| 10,079,741 | B2* | 9/2018 | Park | H04L 43/067 |
| 10,142,851 | B2* | 11/2018 | Tao | H04W 16/14 |
| 10,206,133 | B2* | 2/2019 | Wu | H04W 24/10 |
| 10,602,318 | B2* | 3/2020 | Liu | H04W 74/06 |
| 2008/0032677 | A1* | 2/2008 | Catovic | H04W 72/085 455/414.1 |
| 2012/0264449 | A1* | 10/2012 | Kazmi | H04W 24/10 455/456.1 |
| 2013/0077507 | A1 | 3/2013 | Yu et al. | |
| 2013/0182583 | A1* | 7/2013 | Siomina | H04W 24/00 370/252 |
| 2014/0112180 | A1* | 4/2014 | Axmon | H04W 24/08 370/252 |
| 2014/0146696 | A1* | 5/2014 | Lin | H04W 72/12 370/252 |
| 2014/0241198 | A1 | 8/2014 | Sun et al. | |
| 2015/0208263 | A1* | 7/2015 | Behravan | H04W 24/10 370/252 |
| 2015/0365206 | A1 | 12/2015 | Yaacoub et al. | |
| 2016/0044551 | A1 | 2/2016 | Frenger et al. | |
| 2017/0339593 | A1* | 11/2017 | Sun | H04L 5/0051 |

FOREIGN PATENT DOCUMENTS

| | | |
|---|---|---|
| CN | 103609161 A | 2/2014 |
| CN | 103797851 A | 5/2014 |
| CN | 105050122 A | 11/2015 |
| CN | 105309001 A | 2/2016 |
| EP | 2963965 A1 | 1/2016 |
| WO | 2013191636 A1 | 12/2013 |
| WO | 2016093745 A1 | 6/2016 |
| WO | 2016117985 A1 | 7/2016 |

OTHER PUBLICATIONS

International Search Report dated Nov. 13, 2017 in corresponding International Patent Application No. PCT/CN2017/097560 (4 pages).
International Search Report dated Nov. 13, 2017 in corresponding International Patent Application No. PCT/CN2017/097560.
"RRM Measurement for NR," 3GPP DRAFT, R1-167200, Gothenburg, Sweden, XP051140571, pp. 1-4, 3rd Generation Partnership Project—Valbonne, France (Aug. 22-26, 2016).
CN/2016108649014, Office Action, dated May 29, 2020.
"NR operation in unlicensed spectrum," 3GPP TSG RAN WG1 meeting #86, Gothenburg, Sweden, R1-166868, pp. 1-5, 3rd Generation Partnership Project, Valbonne, France (Aug. 22-26, 2016).

* cited by examiner

RESOURCE MANAGEMENT INDICATION METHOD AND APPARATUS WITH FLEXIBLE MANNER OF MEASUREMENT

CROSS-REFERENCE TO RELATED APPLICATIONS

This application is a continuation of International Application No. PCT/CN2017/097560, filed on Aug. 15, 2017, which claims priority to Chinese Patent Application No. 201610864901.4, filed on Sep. 28, 2016. The disclosures of the aforementioned applications are hereby incorporated by reference in their entireties.

TECHNICAL FIELD

This disclosure relates to wireless communications technologies, and in particular, to a resource management indication method and apparatus.

BACKGROUND

A downlink-based measurement manner is used in a radio resource management (Radio Resource Management, RRM) method for an existing Long Term Evolution (Long Term Evolution, LTE) system. To be specific, a base station sends a downlink reference signal, for example, a cell-specific reference signal (Cell-specific Reference Signal, CRS) at a fixed time-frequency location, and a terminal measures a measurement result such as reference signal received power (Reference Signal Received Power, RSRP) or reference signal received quality (Reference Signal Received Quality, RSRQ) of the CRS sent by the base station, and reports the measurement result to the base station, so that the base station determines handover and movement of the terminal.

However, in the existing manner, the terminal performs measurement depending only on a manner of frequently receiving downlink reference signals. This causes excessive overheads on a network side, especially in a case of dense base station deployment.

SUMMARY

This application provides a resource management indication method and apparatus, to resolve a prior-art problem of excessive overheads on a network side.

A first aspect of this application provides a resource management indication method, including:

generating, by a base station, radio resource management RRM measurement manner indication information, where the RRM measurement manner indication information is used to indicate an RRM measurement manner; and sending, by the base station, the RRM measurement manner indication information to a terminal, where the RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

Optionally, the RRM measurement manner may be preconfigured for the base station and the terminal, so that the base station and the terminal directly perform measurement based on the preconfigured RRM measurement manner.

Optionally, the RRM measurement manner indication information may be carried in any one of the following messages:

radio resource control RRC signaling, a downlink control information DCI message, a paging message, and a Media Access Control MAC control element CE message.

Optionally, when the current RRM measurement manner is the uplink assisted downlink RRM measurement, the method further includes:

receiving, by the base station, the uplink measurement signal sent by the terminal;

adjusting, by the base station based on the uplink measurement signal, the sending of the downlink measurement signal; and receiving, by the base station, the downlink measurement result that is measured and sent by the terminal based on the downlink measurement signal and that is sent by the terminal.

Optionally, the adjusting, by the base station based on the uplink measurement signal, the sending of the downlink measurement signal includes:

obtaining, by the base station, an uplink measurement result based on the uplink measurement signal; and selecting, by the base station based on the uplink measurement result, one or more base stations in a network to which the base station belongs, to send the downlink measurement signal to the terminal.

Optionally, when the RRM measurement manner is the downlink assisted uplink RRM measurement, the method further includes:

sending, by the base station, the downlink measurement signal to the terminal, so that the terminal adjusts, based on the downlink measurement signal, the sending of the uplink measurement signal; and receiving, by the base station, the uplink measurement signal sent by the terminal, to perform the RRM measurement.

Optionally, the method further includes:

obtaining, by the base station, the uplink measurement signal sent by the terminal, and determining an updated RRM measurement manner based on the uplink measurement signal; and sending, by the base station, updated RRM measurement manner indication information to the terminal, where the updated RRM measurement manner indication information is used to indicate the updated RRM measurement manner.

Optionally, the method further includes:

obtaining, by the base station, a downlink measurement result sent by the terminal based on the downlink measurement signal, and determining an updated RRM measurement manner based on the downlink measurement result; and sending, by the base station, updated RRM measurement manner indication information to the terminal, where the updated RRM measurement manner indication information is used to indicate the updated RRM measurement manner.

Optionally, the generating, by a base station, radio resource management RRM measurement manner indication information includes:

determining, by the base station when a basic parameter satisfies a preset condition, an RRM measurement manner corresponding to the preset condition; and generating, by the base station, the RRM measurement manner indication information based on the RRM measurement manner.

Optionally, the basic parameter includes one or a combination of a plurality of the following:

a quantity of neighboring base stations of the base station;

a quantity of base stations in a cell in which the base station is located;

a quantity of terminals served by the base station;

a quantity of terminals in an active state that are served by the base station;

a period in which a terminal served by the base station sends an uplink measurement signal; and a measurement result determined by the base station based on an uplink measurement signal sent by a terminal.

Optionally, when the basic parameter includes the quantity of neighboring base stations of the base station and the quantity of base stations in the cell in which the base station is located, the determining, by the base station when a basic parameter satisfies a preset condition, a radio resource management RRM measurement manner corresponding to the preset condition includes:

determining, by the base station when the quantity of neighboring base stations of the base station is greater than a first preset threshold or the quantity of base stations in the cell in which the base station is located is greater than a second preset threshold, that the RRM measurement manner is the uplink RRM measurement; or determining, by the base station when the quantity of neighboring base stations of the base station is less than a third preset threshold or the quantity of base stations in the cell in which the base station is located is less than a fourth preset threshold, that the RRM measurement manner is the downlink RRM measurement.

Optionally, when the basic parameter includes the quantity of neighboring base stations of the base station and the quantity of terminals served by the base station, the determining, by the base station when a basic parameter satisfies a preset condition, a radio resource management RRM measurement manner corresponding to the preset condition includes:

determining, by the base station when the quantity of neighboring base stations of the base station is greater than a fifth preset threshold and the quantity of terminals served by the base station is less than a sixth preset threshold, that the RRM measurement manner is the uplink RRM measurement; or determining, by the base station when the quantity of neighboring base stations of the base station is less than a seventh preset threshold and the quantity of terminals served by the base station is greater than an eighth preset threshold, that the RRM measurement manner is the downlink RRM measurement.

Optionally, when the basic parameter includes the quantity of base stations in the cell in which the base station is located and the quantity of terminals served by the base station, the determining, by the base station when a basic parameter satisfies a preset condition, a radio resource management RRM measurement manner corresponding to the preset condition includes:

determining, by the base station when the quantity of base stations in the cell in which the base station is located is greater than a ninth preset threshold and the quantity of terminals served by the base station is less than a tenth preset threshold, that the RRM measurement manner is the uplink RRM measurement; or determining, by the base station when the quantity of base stations in the cell in which the base station is located is less than an eleventh preset threshold and the quantity of terminals served by the base station is greater than a twelfth preset threshold, that the RRM measurement manner is the downlink RRM measurement.

Optionally, when the basic parameter includes the quantity of terminals in an active state that are served by the base station, the determining, by the base station when a basic parameter satisfies a preset condition, a radio resource management RRM measurement manner corresponding to the preset condition includes:

determining, by the base station when the quantity of terminals in an active state that are served by the base station is greater than a thirteenth threshold, that the RRM measurement manner is the downlink RRM measurement; or determining, by the base station when the quantity of terminals in an active state that are served by the base station is less than a fourteenth threshold, that the RRM measurement manner is the uplink RRM measurement.

Optionally, when the basic parameter includes the period in which the terminal served by the base station sends the uplink measurement signal, the determining, by the base station when a basic parameter satisfies a preset condition, a radio resource management RRM measurement manner corresponding to the preset condition includes:

determining, by the base station when the period in which the terminal served by the base station sends the uplink measurement signal is less than a first preset time, that the RRM measurement manner is the downlink RRM measurement; or determining, by the base station when the period in which the terminal served by the base station sends the uplink measurement signal is greater than a second preset time, that the RRM measurement manner is the uplink RRM measurement.

Optionally, when the basic parameter includes the measurement result determined by the base station based on the uplink measurement signal sent by the terminal, the determining, by the base station when a basic parameter satisfies a preset condition, a radio resource management RRM measurement manner corresponding to the preset condition includes:

obtaining, by the base station, the uplink measurement result based on the uplink measurement signal sent by the terminal; and determining, by the base station when the uplink measurement result is less than a first preset parameter value, that the RRM measurement manner is the downlink RRM measurement; or determining, by the base station when the uplink measurement result is greater than a second preset parameter value, that the RRM measurement manner is the uplink RRM measurement.

A second aspect of this application provides a resource management indication method, including:

receiving, by a terminal, radio resource management RRM measurement manner indication information sent by a base station, where the RRM measurement manner indication information is used to indicate an RRM measurement manner to the terminal; and performing, by the terminal, RRM measurement based on the RRM measurement manner, where the RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

Optionally, the RRM measurement manner may be preconfigured for the base station and the terminal, so that the base station and the terminal directly perform measurement based on the preconfigured RRM measurement manner.

Optionally, the RRM measurement manner indication information is carried in any one of the following messages:

radio resource control RRC signaling, a DCI message, a paging message, and a Media Access Control MAC CE message.

Optionally, when the RRM measurement manner is the uplink assisted downlink RRM measurement, the performing, by the terminal, RRM measurement based on the RRM measurement manner includes:

sending, by the terminal, the uplink measurement signal to the base station, and receiving a downlink measurement signal sent by one or more base stations in a network to which the base station belongs; and obtaining, by the terminal, a downlink measurement result based on the downlink measurement signal, and sending the downlink measurement result to the base station.

Optionally, when the RRM measurement manner is the downlink assisted uplink RRM measurement, the performing, by the terminal, RRM measurement based on the RRM measurement manner includes:

receiving, by the terminal, the downlink measurement signal sent by the base station; and adjusting, by the terminal based on the downlink measurement signal, the sending of the uplink measurement signal.

A third aspect of the embodiments of this application provides a resource management indication apparatus, including:

a processor, configured to generate radio resource management RRM measurement manner indication information, where the RRM measurement manner indication information is used to indicate an RRM measurement manner; and a transmitter, configured to send the RRM measurement manner indication information to a terminal, where the RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

Optionally, the RRM measurement manner indication information may be carried in any one of the following messages:

radio resource control RRC signaling, a downlink control information DCI message, a paging message, and a Media Access Control MAC control element CE message.

Optionally, the apparatus further includes a receiver, where when the current RRM measurement manner is the uplink assisted downlink RRM measurement, the receiver is configured to receive the uplink measurement signal sent by the terminal;

the processor is configured to adjust, based on the uplink measurement signal, the sending of the downlink measurement signal; and the receiver is further configured to receive the downlink measurement result that is measured and sent by the terminal based on the downlink measurement signal and that is sent by the terminal.

Optionally, the processor is specifically configured to: obtain an uplink measurement result based on the uplink measurement signal; and select, based on the uplink measurement result, one or more base stations in a network to which the base station belongs, to send the downlink measurement signal to the terminal.

Optionally, the apparatus further includes a receiver, where when the RRM measurement manner is the downlink assisted uplink RRM measurement, the transmitter is configured to send the downlink measurement signal to the terminal, so that the terminal adjusts, based on the downlink measurement signal, the sending of the uplink measurement signal; and the receiver is configured to receive the uplink measurement signal sent by the terminal, to perform the RRM measurement.

Optionally, the processor is further configured to: obtain the uplink measurement signal sent by the terminal, and determine an updated RRM measurement manner based on the uplink measurement signal; and the transmitter is further configured to send updated RRM measurement manner indication information to the terminal, where the updated RRM measurement manner indication information is used to indicate the updated RRM measurement manner.

Optionally, the processor is further configured to: obtain a downlink measurement result sent by the terminal based on the downlink measurement signal, and determine an updated RRM measurement manner based on the downlink measurement result; and the transmitter is further configured to send updated RRM measurement manner indication information to the terminal, where the updated RRM measurement manner indication information is used to indicate the updated RRM measurement manner.

Optionally, the processor is specifically configured to: determine, when a basic parameter satisfies a preset condition, an RRM measurement manner corresponding to the preset condition; and generate the RRM measurement manner indication information based on the RRM measurement manner.

Optionally, the basic parameter includes one or a combination of a plurality of the following:

a quantity of neighboring base stations of the base station;

a quantity of base stations in a cell in which the base station is located;

a quantity of terminals served by the base station;

a quantity of terminals in an active state that are served by the base station;

a period in which a terminal served by the base station sends an uplink measurement signal; and a measurement result determined by the base station based on an uplink measurement signal sent by a terminal.

Optionally, when the basic parameter includes the quantity of neighboring base stations of the base station and the quantity of base stations in the cell in which the base station is located, the processor is specifically configured to: determine, when the quantity of neighboring base stations of the base station is greater than a first preset threshold or the quantity of base stations in the cell in which the base station is located is greater than a second preset threshold, that the RRM measurement manner is the uplink RRM measurement; or determine, when the quantity of neighboring base stations of the base station is less than a third preset threshold or the quantity of base stations in the cell in which the base station is located is less than a fourth preset threshold, that the RRM measurement manner is the downlink RRM measurement.

Optionally, when the basic parameter includes the quantity of neighboring base stations of the base station and the quantity of terminals served by the base station, the processor is specifically configured to: determine, when the quantity of neighboring base stations of the base station is greater than a fifth preset threshold and the quantity of terminals served by the base station is less than a sixth preset threshold, that the RRM measurement manner is the uplink RRM measurement; or determine, when the quantity of neighboring base stations of the base station is less than a seventh preset threshold and the quantity of terminals served by the base station is greater than an eighth preset threshold, that the RRM measurement manner is the downlink RRM measurement.

A fourth aspect of the embodiments of this application provides a resource management indication apparatus, including:

a receiver, configured to receive radio resource management RRM measurement manner indication information sent by a base station, where the RRM measurement manner indication information is used to indicate an RRM measurement manner to the terminal; and a processor, configured to perform RRM measurement based on the RRM measurement manner, where the RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

Optionally, the RRM measurement manner indication information is carried in any one of the following messages:

radio resource control RRC signaling, a DCI message, a paging message, and a Media Access Control MAC CE message.

Optionally, the apparatus further includes a transmitter; and when the RRM measurement manner is the uplink assisted downlink RRM measurement, the processor is specifically configured to: send the uplink measurement signal to the base station by using the transmitter, and receive, by using the receiver, a downlink measurement signal sent by one or more base stations in a network to which the base station belongs; and obtain a downlink measurement result based on the downlink measurement signal, and send the downlink measurement result to the base station by using the transmitter.

Optionally, when the RRM measurement manner is the downlink assisted uplink RRM measurement, the processor is specifically configured to: receive, by using the receiver, the downlink measurement signal sent by the base station; and adjust, based on the downlink measurement signal, the sending of the uplink measurement signal.

A fifth aspect of the embodiments of this application provides a resource management indication apparatus, where the apparatus includes a module or means (means) for performing the method provided in the first aspect and the various implementations of the first aspect.

A sixth aspect of the embodiments of this application provides a resource management indication apparatus, where the apparatus includes a module or means (means) for performing the method provided in the second aspect and the various implementations of the second aspect.

A seventh aspect of the embodiments of this application provides a resource management indication apparatus, including at least one processing element (or chip) for performing the method in the first aspect.

An eighth aspect of the embodiments of this application provides a resource management indication apparatus, including at least one processing element (or chip) for performing the method in the second aspect.

According to the resource management indication method and apparatus provided in the embodiments of this application, the base station sends the RRM measurement manner indication information to the terminal to indicate the RRM measurement manner to the terminal, and the terminal performs the RRM measurement based on the RRM measurement manner. In this way, the base station can flexibly indicate the RRM measurement manner to the terminal, so that a more proper RRM measurement manner is used, to improve measurement efficiency and reduce measurement overheads.

DESCRIPTION OF EMBODIMENTS

A base station, also referred to as a radio access network (Radio Access Network, RAN) device, is a device that connects a terminal and a wireless network, and may be a base transceiver station (Base Transceiver Station, BTS) in a Global System for Mobile communications (Global System for Mobile communications, GSM) or Code Division Multiple Address (Code Division Multiple Access, CDMA), or may be a NodeB (NodeB, NB) in Wideband Code Division Multiple Access (Wideband Code Division Multiple Access, WCDMA), or may be an evolved NodeB (Evolved NodeB, eNB or eNodeB) in Long Term Evolution (Long Term Evolution, LTE), a relay station, an access point, a base station or the like in a future 5G network, or even a terminal having a base station function in D2D (Device-to-Device, device-to-device) communication, or may be another device having a network side function. This is not limited herein.

A terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (Personal Communications Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), a user device (User Device or User Equipment). This is not limited herein.

The term "a plurality of" in the embodiments of this application means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
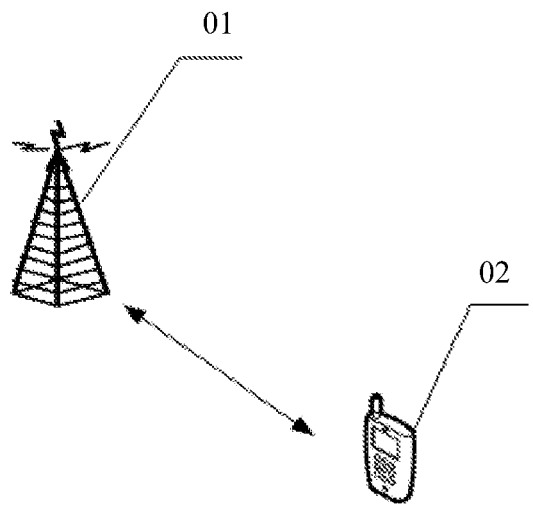
FIG. 1 is a schematic architectural diagram of a system of a resource management indication method according to an embodiment of this application.

FIG. 1 is a schematic architectural diagram of a system of a resource management indication method according to an embodiment of this application. As shown in FIG. 1, the system includes a base station 01 and a terminal 02.

The base station 01 may be a next-generation new radio (New Radio, NR) base station, or may be another existing base station or another existing network device. This is not limited herein. The base station may alternatively be referred to as a transmission reception point (Transmission Reception Point, TRP).

In a next-generation wireless communications system, namely, an NR system, introducing a measurement method that is based on an uplink signal is considered, to reduce dependence of RRM on frequently sending a fixed downlink reference signal by a network and to improve system efficiency. To be specific, a terminal sends an uplink signal, and an NR base station associated with the terminal and a neighboring base station measure an uplink measurement signal sent by the terminal, and compare and determine measurement results of the base stations, to determine that the terminal is to be handed over to a proper base station for serving. Use of uplink measurement enables the network to track the terminal, so that the network can not only track a current location of the terminal but also learn of a base station that may be most proper currently. In addition, use of uplink measurement can further implement quick access of the terminal, reduce downlink signaling overheads, and bring a gain to improve network performance.

Certainly, a measurement manner is not limited to uplink measurement and downlink measurement. This embodiment of this application further provides another measurement manner. In consideration of parameters such as network overheads and power consumption, different measurement manners are probably applicable to different scenarios. In this embodiment of this application, a plurality of measurement manners are mainly flexibly adjusted, to select a current most proper measurement manner.

Figure 2:
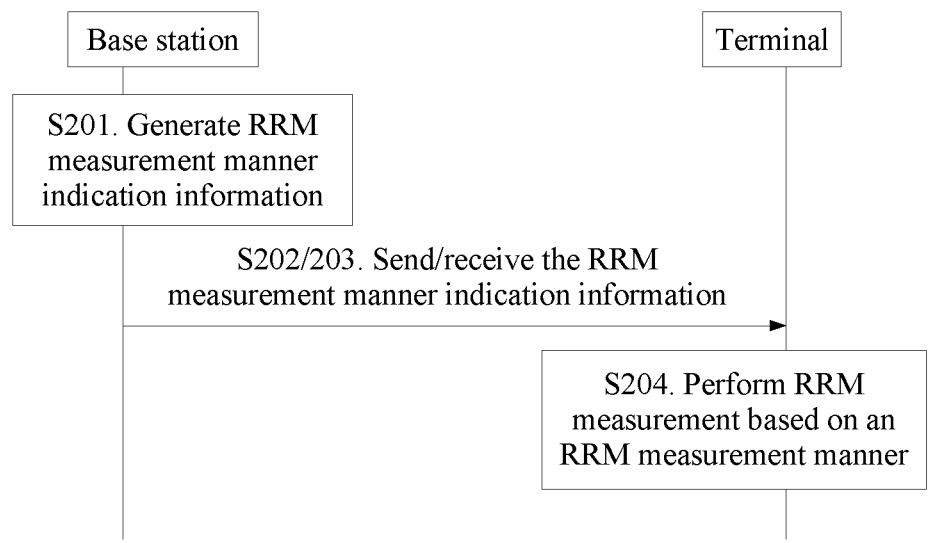
FIG. 2 is a schematic flowchart of a resource management indication method according to an embodiment of this application.

FIG. 2 is a schematic flowchart of a resource management indication method according to an embodiment of this application. As shown in FIG. 2, the method includes the following steps.

S201. A base station generates RRM measurement manner indication information, where the RRM measurement manner indication information is used to indicate an RRM measurement manner.

The base station may determine a current RRM measurement manner based on a different scenario, a signal parameter, or the like. This is not limited herein. The RRM measurement manner indication information usually indicates a currently used RRM measurement manner. This is not limited herein.

S202. The base station sends the RRM measurement manner indication information to a terminal.

Optionally, the base station may separately send the RRM measurement manner indication information to a terminal or a group of terminals, or may broadcast the RRM measurement manner indication information in a network. This is not limited herein.

The terminal currently accesses to the base station.

S203. The terminal receives the RRM measurement manner indication information sent by the base station.

S204. The terminal performs RRM measurement based on the RRM measurement manner.

The RRM measurement manner may include any one or more of the following:

(1) Downlink RRM measurement, indicating that the terminal performs RRM measurement based on a downlink measurement signal delivered by the base station, and sends a measurement result to the base station.

After receiving the RRM measurement manner indication information, the terminal determines that the current RRM measurement manner is the downlink RRM measurement, and then receives the downlink measurement signal sent by the base station.

Optionally, the terminal may receive a downlink measurement signal sent by one or more base stations in the network.

The downlink measurement signal may be a downlink reference signal, such as a CRS, sent by the base station. This is not limited herein.

The terminal measures a parameter such as RSRP or RSRQ of the downlink reference signal as a measurement result. This is not limited herein. Then, the terminal reports the measurement result to the base station. It should be noted that, the base station to which the terminal reports the measurement result may be the foregoing base station, or may be a specified base station in the network to which the base station belongs. The base station receives an uplink measurement result, and considers, with reference to the uplink measurement result and the downlink measurement result, whether the terminal needs to be handed over to another base station or the like.

(2) Uplink RRM measurement, indicating that the terminal sends an uplink measurement signal to the base station, and the base station performs RRM measurement.

The uplink measurement signal may be an uplink signal sent by the terminal to the base station. After determining that the current RRM measurement manner is the uplink RRM measurement, the terminal sends an uplink signal to the base station, and the base station measures the uplink signal sent by the terminal, and similarly, may obtain RSRP or RSRQ of the uplink signal as a measurement result. This is not limited herein.

Optionally, one or more base stations in the network to which the base station belongs may measure the uplink signal sent by the terminal. Finally, a specified core base station in the network may comprehensively consider measurement results obtained by the one or more base stations. This is not limited herein. Then, the base station determines, based on the measurement results, whether the terminal needs to be handed over to another base station or the like.

(3) Both downlink RRM measurement and uplink RRM measurement being performed.

To be specific, the base station sends a downlink measurement signal to the terminal, and the terminal sends an uplink measurement signal to the base station. The base station obtains an uplink measurement result based on the uplink measurement signal, and the terminal obtains a downlink measurement result based on the downlink measurement signal. Then, the terminal reports the downlink measurement result to the base station. It should be noted that, the base station to which the terminal reports the downlink measurement result may be the foregoing base station, or may be a specified base station in the network to which the base station belongs. The base station receives the reported downlink measurement result, and considers, with reference to the uplink measurement result and the downlink measurement result, whether the terminal needs to be handed over to another base station or the like.

(4) Uplink assisted downlink RRM measurement, indicating that the base station adjusts, based on an uplink measurement signal sent by the terminal, sending of a downlink measurement signal, and receives a measurement result reported by the terminal.

Optionally, in this manner, one or more base stations in the network to which the base station belongs may receive the uplink measurement signal and perform measurement. Then, the sending of the downlink measurement signal is adjusted based on the measurement result. Specifically, base stations that send the downlink measurement signal may be adjusted.

In the network, a core base station may be specified. The core base station may flexibly adjust, based on the uplink measurement signal, base stations that receive the uplink measurement signal. For example, at first, all base stations in the network may receive the uplink measurement signal sent by the terminal, and obtain an uplink measurement result. Then, one or more base stations with better measurement results are selected to continue to receive the uplink measurement signal. Subsequently, adjustment may be further performed at any time based on a measurement result.

After obtaining the measurement result based on the uplink signal, one or more better base stations are further selected to send a downlink measurement signal to the terminal. For example, one or more base stations with highest RSRP or RSRQ are selected to send a downlink measurement signal to the terminal.

(5) Downlink assisted uplink RRM measurement, indicating that the terminal adjusts, based on a downlink measurement signal sent by the base station, sending of an uplink measurement signal, and the base station performs RRM measurement.

In this measurement manner, the base station mainly performs measurement based on the uplink measurement signal sent by the terminal. However, the terminal also receives the downlink measurement signal sent by the base station, and adjusts, based on the downlink measurement signal, the sending of the uplink measurement signal, for example, adjusts a sending period of the uplink measurement signal, or base stations to which the uplink measurement signal is sent.

It should be noted that, the RRM measurement manner may be preconfigured for the base station and the terminal, so that the base station and the terminal directly perform measurement based on the preconfigured RRM measurement manner. For example, the downlink RRM measurement is preconfigured. In this case, the base station may directly send the downlink measurement signal to the terminal, and the terminal performs measurement based on the downlink measurement signal, and reports the downlink measurement result. This is not limited herein.

Certainly, the RRM measurement manner may be subsequently updated by using the RRM measurement manner indication information.

In this embodiment, the base station sends the RRM measurement manner indication information to the terminal to indicate the RRM measurement manner to the terminal, and the terminal performs the RRM measurement based on the RRM measurement manner. In this way, the base station can flexibly indicate the RRM measurement manner to the terminal, so that a more proper RRM measurement manner is used, to improve measurement efficiency and reduce measurement overheads.

Figure 3:
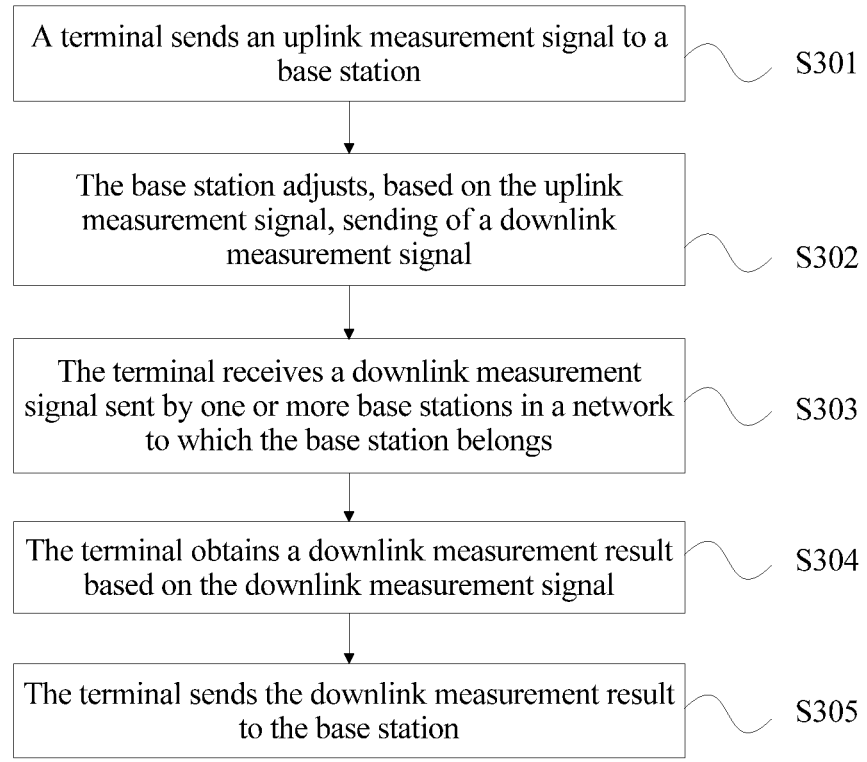
FIG. 3 is a schematic flowchart of another resource management indication method according to an embodiment of this application.

FIG. 3 is a schematic flowchart of another resource management indication method according to an embodiment of this application. As shown in FIG. 3, when an RRM measurement manner is uplink assisted downlink RRM measurement, a measurement process may include the following steps.

S301. A terminal sends an uplink measurement signal to a base station.

S302. The base station adjusts, based on the uplink measurement signal, sending of a downlink measurement signal.

Specifically, the base station adjusts a sending period of the downlink measurement signal; or the base station adjusts a base station that sends the downlink measurement signal to the terminal, for example, selects, based on the uplink measurement signal, one or more better base stations in a network to send the downlink measurement signal to the terminal.

S303. The terminal receives a downlink measurement signal sent by one or more base stations in a network to which the base station belongs.

S304. The terminal obtains a downlink measurement result based on the downlink measurement signal.

S305. The terminal sends the downlink measurement result to the base station.

The base station may alternatively select one or more base stations in the network to which the base station belongs, to obtain the uplink measurement signal; obtain an uplink measurement result based on the uplink measurement signal, for example, measure RSRP or RSRQ of an uplink signal; and flexibly adjust, based on the uplink measurement result, a base station receiving the uplink measurement signal and a base station sending the downlink measurement signal, for example, select several base stations with higher measurement result ranks to receive the uplink measurement signal, and the several base stations send the downlink measurement signal to the terminal.

The base station receives the downlink measurement result sent by the terminal, for example, the terminal measures RSRP or RSRQ of a downlink reference signal. Then, the base station determines a location and handover of the terminal based on the downlink measurement result.

In this manner, measurement and handover accuracy can be improved, and sending overheads of the downlink measurement signal can be reduced.

Figure 4:
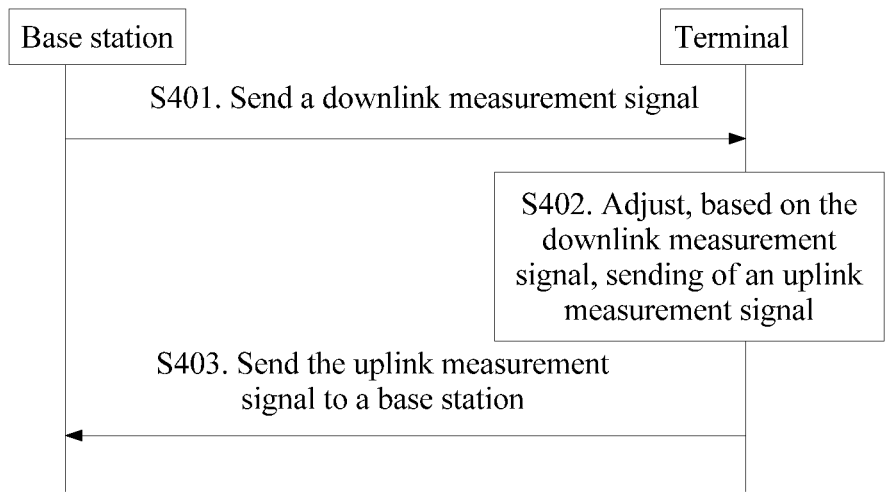
FIG. 4 is a schematic flowchart of another resource management indication method according to an embodiment of this application.

FIG. 4 is a schematic flowchart of another resource management indication method according to an embodiment of this application. As shown in FIG. 4, when an RRM measurement manner is downlink assisted uplink RRM measurement, a measurement process may include the following steps.

S401. A base station sends a downlink measurement signal to a terminal.

In addition, the base station may also receive an uplink measurement signal sent by the terminal. In this case, the terminal may send the uplink measurement signal based on an original period.

S402. The terminal adjusts, based on the downlink measurement signal, sending of an uplink measurement signal.

Specifically, based on the downlink measurement signal, the terminal may adjust a sending period of the uplink measurement signal, or adjust base stations to which the uplink measurement signal is sent, or the like. This is not limited herein.

For example, if a measurement result, namely, RSRP or RSRQ, obtained by the terminal based on the downlink measurement signal is less than a first preset threshold, it indicates that the terminal is relatively distant from the base station, and may enter a handover area. In this case, the period in which the terminal sends the uplink measurement signal may be reduced, in other words, sending frequency is increased, so that measurement and tracking are performed on the terminal in a timely manner, and a more accurate handover decision is made. On the contrary, if a measurement result, namely, RSRP or RSRQ, obtained by the terminal based on the downlink measurement signal is greater than a second preset threshold, it indicates that the terminal is very close to the base station, and a handover probability is relatively low. In this case, the period in which the terminal sends the uplink measurement signal may be increased, so that the terminal can save energy and improve efficiency.

Optionally, after receiving the downlink measurement signal, the terminal also obtains the measurement result based on the downlink measurement signal, and reports the measurement result to the base station.

S403. The terminal sends the uplink measurement signal to the base station. To be specific, the terminal sends the uplink measurement signal to the base station in an adjusted manner.

Alternatively, the base station may adjust an uplink transmission period of the terminal after receiving the downlink measurement result. In this case, the base station sends an indication message to the terminal, to indicate an adjusted period to the terminal. For example, if the base station learns that the measurement result, namely, RSRP or RSRQ, obtained by the terminal based on the downlink measurement signal is less than the first preset threshold, it indicates that the terminal is relatively distant from the base station, and may enter the handover area. In this case, the period in which the terminal sends the uplink measurement signal may be reduced, in other words, sending frequency is increased, so that measurement and tracking are performed on the terminal in a timely manner, and a more accurate handover decision is made. On the contrary, if the base station learns that the measurement result, namely, RSRP or RSRQ, obtained by the terminal based on the downlink measurement signal is greater than the second preset threshold, it indicates that the terminal is very close to the base station, and the handover probability is relatively low. In this case, the period in which the terminal sends the uplink measurement signal may be increased, so that the terminal can save energy and improve efficiency.

Figure 5:
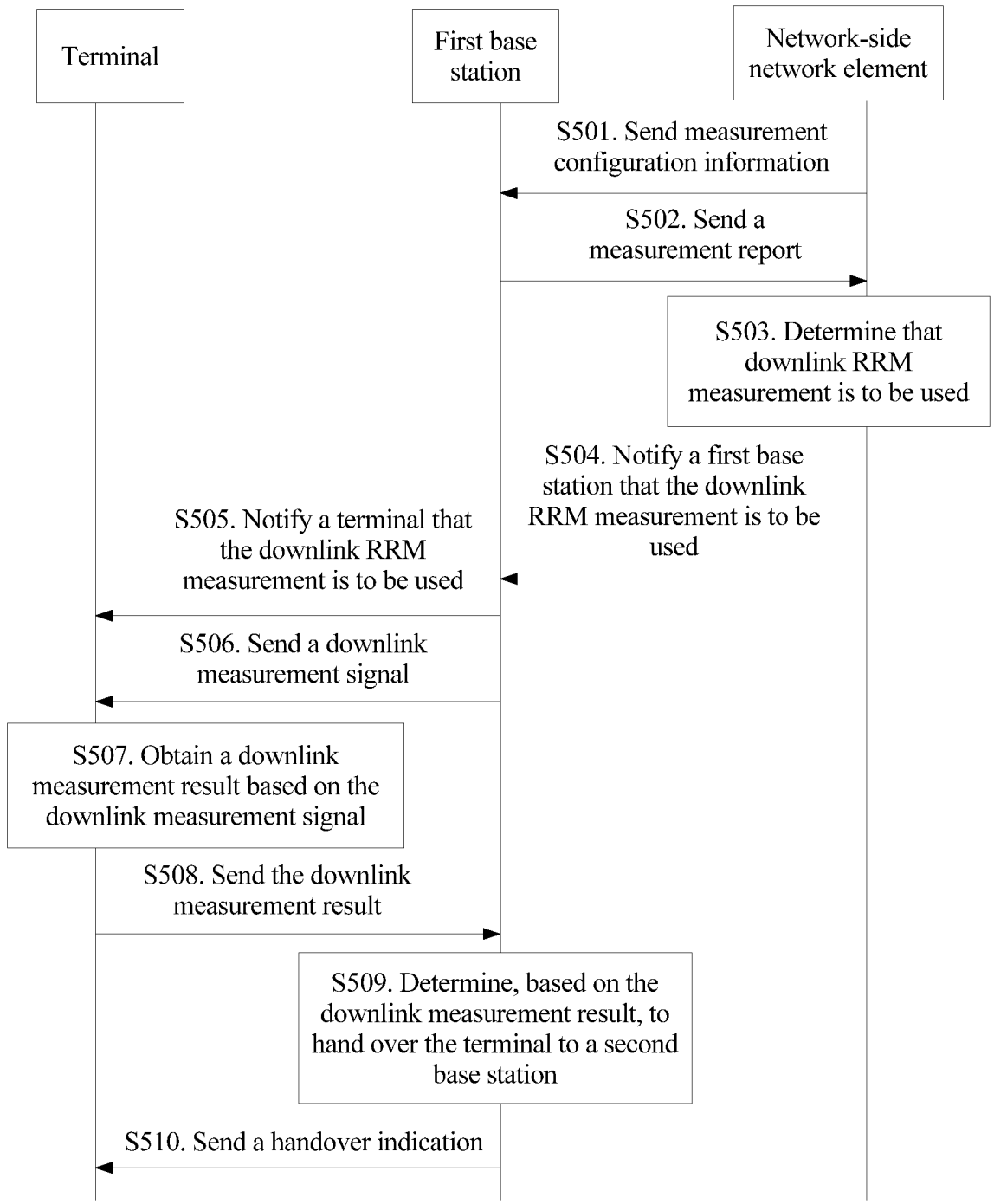
FIG. 5 is a schematic flowchart of another resource management indication method according to an embodiment of this application.

FIG. 5 is a schematic flowchart of another resource management indication method according to an embodiment of this application. In this embodiment, a complete measurement process is shown, and a terminal is handed over to another base station based on a measurement result. For example, the terminal is currently served by a first base station. As shown in FIG. 5, the method includes the following steps.

S501. A network-side network element sends measurement configuration information to the first base station.

It should be noted that, the network-side network element herein may be a central control unit (Central Unit, CU) in a network, or may be a specified base station. This is not limited herein.

S502. The first base station sends a measurement report to the network-side network element.

Configuration work before measurement is completed.

It should be noted that, S501 and S502 are optional steps, and may be selectively performed based on a specific case. This is not limited herein.

S503. The network-side network element determines that downlink RRM measurement is to be used.

S504. The network-side network element notifies the first base station that the downlink RRM measurement is to be used.

S505. The first base station notifies the terminal that the downlink RRM measurement is to be used.

S506. The first base station sends a downlink measurement signal to the terminal.

S507. The terminal obtains a downlink measurement result based on the downlink measurement signal.

S508. The terminal sends the downlink measurement result to the first base station.

S509. The first base station determines, based on the downlink measurement result, to hand over the terminal to a second base station.

For example, when the downlink measurement result, namely, RSRP or RSRQ, is less than a preset threshold, the first base station determines to hand over the terminal to the second base station.

It should be noted that, information exchanged between the terminal and the first base station is synchronized to the network-side network element, and the network-side network element also knows that the terminal is to be handed over to the second base station.

S510. The first base station sends a handover indication to the terminal, where the handover indication includes an identifier of the second base station.

Then, the terminal may be handed over according to the handover indication.

Figure 6:
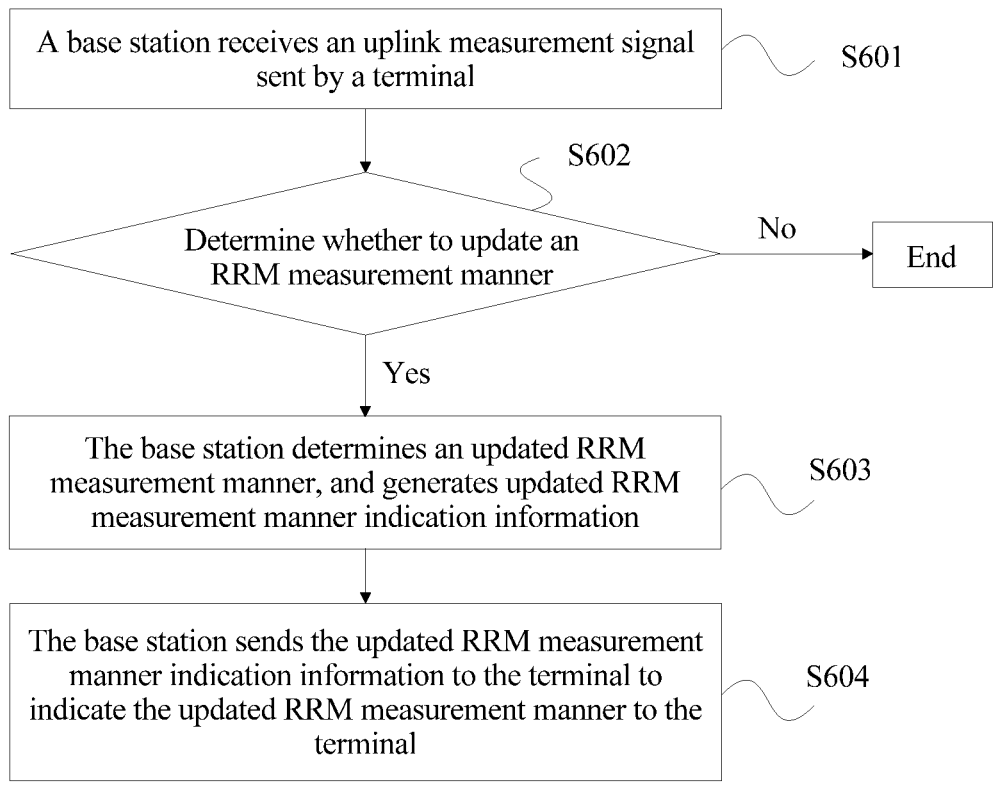
FIG. 6 is a schematic flowchart of another resource management indication method according to an embodiment of this application.

FIG. 6 is a schematic flowchart of another resource management indication method according to an embodiment of this application. An RRM measurement manner indicated by a base station to a terminal may be dynamically adjusted. It is assumed that the terminal uses uplink RRM measurement by default in an initial state. As shown in FIG. 6, the method includes the following steps.

S601. The base station receives an uplink measurement signal sent by the terminal.

S602. The base station determines, based on the uplink measurement signal, whether to update the RRM measurement manner.

If no, the process ends. If yes, S603 is performed.

Specifically, if the base station detects that an uplink measurement result of the uplink measurement signal is less than a preset threshold, it indicates that the terminal enters an edge area covered by the base station. In this case, to improve measurement accuracy, the base station may consider changing the RRM measurement manner to downlink RRM measurement, to be specific, the base station sends a downlink measurement signal, and the terminal performs measurement to obtain a downlink measurement result and reports the downlink measurement result to the base station.

Optionally, if the terminal uses the downlink RRM measurement by default in the initial state, S601 and S602 may be replaced with the following steps: The base station receives a downlink measurement result sent by the terminal, and the base station determines, based on the downlink measurement result, whether to update the RRM measurement manner. For example, the terminal receives a downlink measurement signal sent by the base station, obtains RSRP or RSRQ of the downlink measurement signal, and reports the RSRP or the RSRQ to the base station. Then, the base station determines, based on whether the downlink measurement result satisfies a preset threshold, whether to change the RRM measurement manner.

S603. The base station determines an updated RRM measurement manner, and generates updated RRM measurement manner indication information.

S604. The base station sends the updated RRM measurement manner indication information to the terminal to indicate the updated RRM measurement manner to the terminal.

Then, the terminal performs measurement in the updated RRM measurement manner. To be specific, the terminal receives the downlink measurement signal sent by the base station, obtains the downlink measurement result, and sends the downlink measurement result to the base station.

Certainly, the downlink RRM measurement may alternatively be used by default at first. This is not limited herein.

Optionally, the RRM measurement manner indication information may be carried in any one of the following messages: RRC signaling, downlink control information (Downlink Control Information, DCI), a paging (paging) message, a Media Access Control (Media Access Control) control element (Control Element, CE), and the like.

Optionally, the RRC signaling may be RRC configuration (configuration) signaling or RRC connection reconfiguration (RRC Connection Reconfiguration) signaling. The base station sends the RRC signaling to the terminal. The RRC signaling carries the RRM measurement manner indication information. The base station may send the RRC signaling only to a terminal in an active (active) state.

For example, an RRC connection reconfiguration signaling message may include a "measurement configuration (measConfig)" field/message element, and the field carries the RRM measurement manner indication information.

Similarly, the base station may send the DCI/paging message only to a terminal in an idle (idle) state or in an energy-economic (ECO) state. The DCI/paging (paging) message carries the RRM measurement manner indication information.

For example, the paging message includes a "measurement configuration identifier (MeasConfig-Indication)" field, which represents that the paging message is used to perform measurement configuration. A system information block (system Information block, SIB) message carries the RRM measurement manner indication information. UE that receives the paging message for measurement configuration reads the RRM measurement manner indication information in the corresponding SIB message.

The base station may send the MAC CE only to a terminal in an active (active) state. The MAC CE carries the RRM measurement manner indication information.

Optionally, the RRM measurement manner indication information may be an RRM measurement manner identifier. For example, "01" identifies "downlink RRM measurement", and "10" identifies "uplink assisted downlink RRM measurement". This is not limited herein.

The RRM measurement manner identifier may occupy one or more bits. This is not limited herein. Optionally, the RRM measurement manner indication information occupies four bits. Herein, "0000" identifies "downlink RRM measurement", "0001" identifies "uplink RRM measurement", "0010" identifies that "both uplink RRM measurement and downlink RRM measurement being performed", "0011" identifies "uplink assisted downlink RRM measurement", and "0100" identifies "downlink assisted uplink RRM measurement". It should be noted that, during specific implementation, a field occupied by the RRM measurement manner indication information does not necessarily have four bits. This is only an example herein. A corresponding RRM measurement manner may include but is not limited to the foregoing RRM measurement manners, and there may be only some of the measurement manners.

One or more bits may be occupied in the RRC signaling to carry the RRM measurement manner indication information. A specific frame structure may be shown in Table 1.

TABLE 1

| Reserved | RRM measurement manner indication information |
|---|---|

Optionally, in some scenarios, if terminals are grouped, the RRC signaling may further carry a terminal group identifier. The terminal group identifier may occupy one or more bits. This is not limited herein. A specific frame structure may be shown in Table 2.

TABLE 2

| Reserved | Terminal group identifier |
|---|---|
| Reserved | RRM measurement manner indication information |

It should be noted that, a quantity of bits occupied by the terminal group identifier is only an example. Actually, a length of the terminal group identifier may be determined based on a requirement, and the length may be greater than a length of one byte, or the like.

Optionally, in some scenarios, if a single terminal is indicated, the RRC signaling may further carry a terminal identifier. The terminal identifier is not limited herein. A specific frame structure may be shown in Table 3.

TABLE 3

| Reserved | Terminal identifier |
|---|---|
| Reserved | RRM measurement manner indication information |

Similarly, a quantity of bits occupied by the terminal identifier is only an example. Actually, a length of the terminal identifier may be determined based on a requirement, and the length may be greater than a length of one byte, or the like.

For a manner in which the DCI, the paging message, or the MAC CE carries the RRM measurement manner indication information, refer to Table 1 and Table 2. Details are not described herein again.

Further, that the base station generates the RRM measurement manner indication information may be as follows: The base station determines, when a basic parameter satisfies a preset condition, an RRM measurement manner corresponding to the preset condition. Then, the base station generates the RRM measurement manner indication information based on the RRM measurement manner.

The basic parameter may be a parameter for reflecting a current network environment, a scenario, or the like. The base station selects a currently most proper RRM measurement manner based on the basic parameter.

Optionally, the basic parameter includes one or more of the following:

1. a quantity of neighboring base stations of the base station;

2. a quantity of base stations in a cell in which the base station is located;

3. a quantity of terminals served by the base station;

4. a quantity of terminals in an active state that are served by the base station;

5. a sum of a quantity of terminals in an active state that are served by the base station and a quantity of terminals in an ECO state that are served by the base station;

6. a quantity of terminals that send an uplink signal and that are served by the base station;

7. a sum of a quantity of terminals that send an uplink signal and that are served by the base station and a quantity of terminals in an ECO state that are served by the base station;

8. a sum of a quantity of terminals in an active state that are served by the base station and a quantity of terminals that send an uplink tracking signal and that are served by the base station;

9. a sum of a quantity of terminals that send an uplink signal and that are served by the base station and a quantity of terminals that send an uplink tracking signal and that are served by the base station;

10. a period in which a terminal served by the base station sends an uplink measurement signal; and 11. a measurement result determined by the base station based on an uplink measurement signal sent by a terminal.

The foregoing parameters may reflect a specific status of a current scenario. Different values of the parameters reflect different scenarios. The parameters may be arbitrarily combined to become a reference for the base station to determine the RRM measurement manner. Several combinations are used as an example for description below:

Optionally, when the basic parameter includes the quantity of neighboring base stations of the base station and the quantity of base stations in the cell in which the base station is located, that the base station determines, when a basic parameter satisfies a preset condition, an RRM measurement manner corresponding to the preset condition may be as follows:

The base station determines, when the quantity of neighboring base stations of the base station is greater than a first preset threshold or the quantity of base stations in the cell in which the base station is located is greater than a second preset threshold, that the RRM measurement manner is the uplink RRM measurement. In this way, system downlink overheads can be reduced.

Alternatively, the base station determines, when the quantity of neighboring base stations of the base station is less than a third preset threshold or the quantity of base stations in the cell in which the base station is located is less than a fourth preset threshold, that the RRM measurement manner is the downlink RRM measurement.

The first preset threshold is greater than or equal to the third preset threshold, and the second preset threshold is greater than or equal to the fourth preset threshold.

Optionally, when the basic parameter includes the quantity of neighboring base stations of the base station and the quantity of terminals served by the base station, that the base station determines, when a basic parameter satisfies a preset condition, an RRM measurement manner corresponding to the preset condition may be as follows:

The base station determines, when the quantity of neighboring base stations of the base station is greater than a fifth preset threshold and the quantity of terminals served by the base station is less than a sixth preset threshold, that the RRM measurement manner is the uplink RRM measurement. In this way, system downlink overheads can be reduced.

Alternatively, the base station determines, when the quantity of neighboring base stations of the base station is less than a seventh preset threshold and the quantity of terminals served by the base station is greater than an eighth preset threshold, that the RRM measurement manner is the downlink RRM measurement.

The fifth preset threshold is greater than or equal to the seventh preset threshold, and the eighth preset threshold is greater than or equal to the sixth preset threshold.

Optionally, when the basic parameter includes the quantity of base stations in the cell in which the base station is located and the quantity of terminals served by the base station, that the base station determines, when a basic parameter satisfies a preset condition, an RRM measurement manner corresponding to the preset condition may be as follows:

The base station determines, when the quantity of base stations in the cell in which the base station is located is greater than a ninth preset threshold and the quantity of terminals served by the base station is less than a tenth preset threshold, that the RRM measurement manner is the uplink RRM measurement. In this way, system downlink overheads can be reduced.

Alternatively, the base station determines, when the quantity of base stations in the cell in which the base station is located is less than an eleventh preset threshold and the quantity of terminals served by the base station is greater than a twelfth preset threshold, that the RRM measurement manner is the downlink RRM measurement.

The ninth preset threshold is greater than or equal to the eleventh preset threshold, and the twelfth preset threshold is greater than or equal to the tenth preset threshold.

Optionally, when the basic parameter includes the quantity of terminals in an active state that are served by the base station, that the base station determines, when a basic parameter satisfies a preset condition, an RRM measurement manner corresponding to the preset condition may be as follows:

The base station determines, when the quantity of terminals in an active state that are served by the base station is greater than a thirteenth threshold, that the RRM measurement manner is the downlink RRM measurement.

Alternatively, the base station determines, when the quantity of terminals in an active state that are served by the base station is less than a fourteenth threshold, that the RRM measurement manner is the uplink RRM measurement.

The thirteenth threshold is greater than or equal to the fourteenth threshold.

Optionally, in this implementation, "the quantity of terminals in an active state that are served by the base station" may be replaced with "the quantity of terminals that send an uplink signal and that are served by the base station", and the uplink signal may be a channel sounding reference signal (Sounding Reference Signal, SRS).

Alternatively, "the quantity of terminals in an active state that are served by the base station" may be replaced with "the sum of the quantity of terminals in an active state that are served by the base station and the quantity of terminals in an ECO state that are served by the base station".

Alternatively, "the quantity of terminals in an active state that are served by the base station" may be replaced with "the sum of the quantity of terminals that send an uplink signal and that are served by the base station and the quantity of terminals in an ECO state that are served by the base station".

Alternatively, "the quantity of terminals in an active state that are served by the base station" may be replaced with "the sum of the quantity of terminals in an active state that are served by the base station and the quantity of terminals that send an uplink tracking (tracking) signal and that are served by the base station".

Alternatively, "the quantity of terminals in an active state that are served by the base station" may be replaced with "the sum of the quantity of terminals that send an uplink signal and that are served by the base station and the quantity of terminals that send an uplink tracking signal and that are served by the base station".

A specific signal parameter is not limited herein, and another signal may alternatively be used as the basic parameter.

Optionally, when the basic parameter includes the period in which the terminal served by the base station sends the uplink measurement signal, that the base station determines, when a basic parameter satisfies a preset condition, a radio resource management RRM measurement manner corresponding to the preset condition may be as follows:

The base station determines, when the period in which the terminal served by the base station sends the uplink measurement signal is less than a first preset time, that the RRM measurement manner is the downlink RRM measurement. To be specific, if the period in which the terminal sends the uplink measurement signal is less than the first preset time, it indicates that the terminal sends the uplink measurement signal relatively frequently, and the base station determines the measurement manner as the downlink RRM measurement, to prevent the terminal from frequently sending the uplink measurement signal.

Alternatively, the base station determines, when the period in which the terminal served by the base station sends the uplink measurement signal is greater than a second preset time, that the RRM measurement manner is the uplink RRM measurement.

The second preset time is greater than or equal to the first preset time.

Based on the foregoing embodiment, uplink overheads of the terminal in a system may be determined with reference to one or more of "the period in which the terminal served by the base station sends the uplink measurement signal", "the quantity of terminals in an active state that are served by the base station", "the quantity of terminals in an ECO state that are served by the base station", "the quantity of terminals that send an uplink signal and that are served by the base station", and "the quantity of terminals that send an uplink tracking signal and that are served by the base station". When the uplink overheads are greater than a preset threshold, the base station selects the downlink RRM measurement, to prevent the terminal from frequently sending the uplink measurement signal. When the uplink overheads are less than a preset threshold, the base station selects the uplink RRM measurement.

Optionally, the basic parameter may include the measurement result determined by the base station based on the uplink measurement signal sent by the terminal. In this manner, the uplink RRM measurement may be initially used by default, to be specific, the terminal sends the uplink measurement signal to the base station. Correspondingly, that the base station determines, when a basic parameter satisfies a preset condition, a radio resource management RRM measurement manner corresponding to the preset condition may be as follows:

The base station obtains the uplink measurement result based on the uplink measurement signal sent by the terminal; and determines, when the uplink measurement result is less than a first preset parameter value, that the RRM measurement manner is the downlink RRM measurement. When the uplink measurement result obtained by the base station is less than the first preset parameter value, it indicates that the terminal is located in an edge area of a coverage range of the base station. In this case, to improve measurement accuracy, the base station sends a downlink measurement signal to the terminal, so that the terminal obtains a downlink measurement result based on the downlink measurement signal, and returns the downlink measurement result to the base station, and the base station further determines handover, a location, and the like of the terminal, thereby improving the measurement accuracy.

Alternatively, the base station determines, when the uplink measurement result is greater than a second preset parameter value, that the RRM measurement manner is the uplink RRM measurement.

Figure 7:
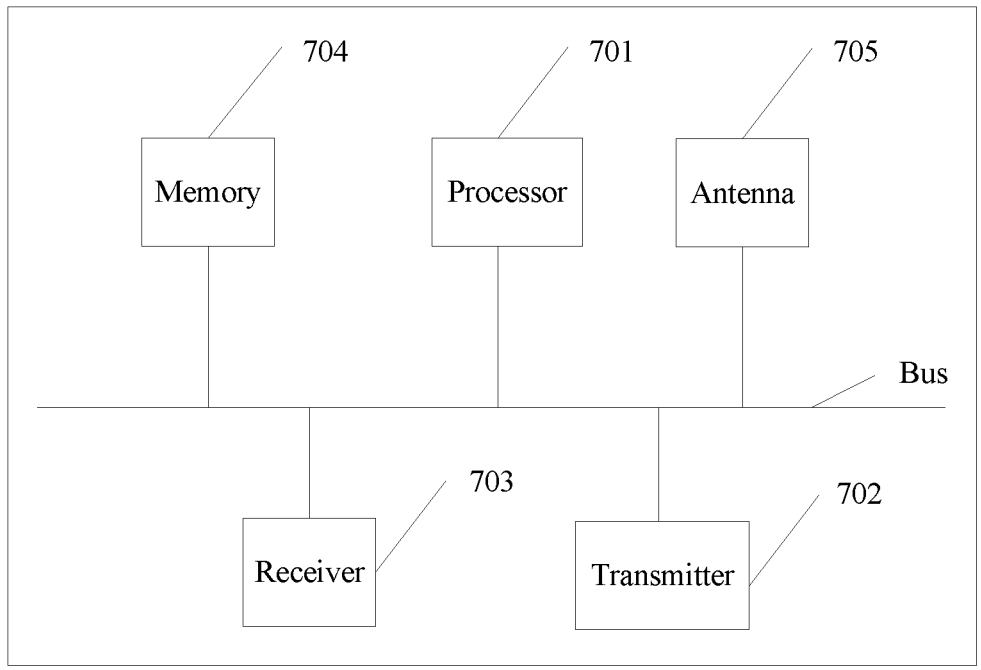
FIG. 7 is a schematic structural diagram of a resource management indication apparatus according to an embodiment of this application.

FIG. 7 is a schematic structural diagram of a resource management indication apparatus according to an embodiment of this application. The apparatus may be integrated into the foregoing base station. As shown in FIG. 7, the apparatus includes a processor 701, a transmitter 702, and a receiver 703; and optionally, may further include a memory 704 and an antenna 705.

The memory 704, the transmitter 702, the receiver 703, and the processor 701 may be connected by using a bus. Certainly, during actual application, the memory 704, the transmitter 702, the receiver 703, and the processor 701 may not be of a bus structure, but may be of another structure, for example, a star structure. This is not specifically limited in this application.

Optionally, the processor 701 may be specifically a general-purpose central processing unit or an ASIC, may be one or more integrated circuits for controlling program execution, may be a hardware circuit developed by using an FPGA, or may be a baseband processor.

Optionally, the processor 701 may include at least one processing core.

Optionally, the memory 704 may include one or more of a ROM, a RAM, and a magnetic disk memory. The memory 704 is configured to store data and/or an instruction that are/is required when the processor 701 runs. There may be one or more memories 704.

The apparatus may be configured to perform any method in the foregoing method embodiments. Specifically, the processor 701 is configured to generate radio resource management RRM measurement manner indication information. The RRM measurement manner indication information is used to indicate an RRM measurement manner.

The transmitter 702 is configured to send the RRM measurement manner indication information to a terminal.

The RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

In this embodiment, the RRM measurement manner indication information is sent to the terminal to indicate the RRM measurement manner to the terminal, and the terminal performs the RRM measurement based on the RRM measurement manner. In this way, the base station can flexibly indicate the RRM measurement manner to the terminal, so that a more proper RRM measurement manner is used, to improve measurement efficiency and reduce measurement overheads.

Optionally, the RRM measurement manner indication information may be carried in any one of the following messages:

radio resource control RRC signaling, a downlink control information DCI message, a paging message, and a Media Access Control MAC control element CE message.

Optionally, when the current RRM measurement manner is the uplink assisted downlink RRM measurement, the receiver 703 is configured to receive the uplink measurement signal sent by the terminal.

The processor 701 is configured to adjust, based on the uplink measurement signal, the sending of the downlink measurement signal. Then, the receiver 703 receives the downlink measurement result that is measured and sent by the terminal based on the downlink measurement signal and that is sent by the terminal.

Optionally, the processor 701 is specifically configured to: obtain an uplink measurement result based on the uplink measurement signal; and select, based on the uplink measurement result, one or more base stations in a network to which the base station belongs, to send the downlink measurement signal to the terminal.

Optionally, when the RRM measurement manner is the downlink assisted uplink RRM measurement, the transmitter 702 is configured to send the downlink measurement signal to the terminal, so that the terminal adjusts, based on the downlink measurement signal, the sending of the uplink measurement signal. The receiver 703 is configured to receive the uplink measurement signal sent by the terminal, to perform the RRM measurement.

Optionally, the processor 701 is further configured to: obtain the uplink measurement signal sent by the terminal, and determine an updated RRM measurement manner based on the uplink measurement signal. The transmitter 702 is further configured to send updated RRM measurement manner indication information to the terminal. The updated RRM measurement manner indication information is used to indicate the updated RRM measurement manner.

Optionally, the processor 701 is further configured to: obtain a downlink measurement result sent by the terminal based on the downlink measurement signal, and determine an updated RRM measurement manner based on the downlink measurement result. The transmitter 702 is further configured to send updated RRM measurement manner indication information to the terminal. The updated RRM measurement manner indication information is used to indicate the updated RRM measurement manner.

Optionally, the processor 701 is specifically configured to: determine, when a basic parameter satisfies a preset condition, an RRM measurement manner corresponding to the preset condition; and generate the RRM measurement manner indication information based on the RRM measurement manner.

The basic parameter includes one or a combination of a plurality of the following:

a quantity of neighboring base stations of the base station;

a quantity of base stations in a cell in which the base station is located;

a quantity of terminals served by the base station;

a quantity of terminals in an active state that are served by the base station;

a period in which a terminal served by the base station sends an uplink measurement signal; and a measurement result determined by the base station based on an uplink measurement signal sent by a terminal.

In a manner, when the basic parameter includes the quantity of neighboring base stations of the base station and the quantity of base stations in the cell in which the base station is located, the processor 701 is specifically configured to: determine, when the quantity of neighboring base stations of the base station is greater than a first preset threshold or the quantity of base stations in the cell in which the base station is located is greater than a second preset threshold, that the RRM measurement manner is the uplink RRM measurement; or determine, when the quantity of neighboring base stations of the base station is less than a third preset threshold or the quantity of base stations in the cell in which the base station is located is less than a fourth preset threshold, that the RRM measurement manner is the downlink RRM measurement.

In another manner, when the basic parameter includes the quantity of neighboring base stations of the base station and the quantity of terminals served by the base station, the processor 701 is specifically configured to: determine, when the quantity of neighboring base stations of the base station is greater than a fifth preset threshold and the quantity of terminals served by the base station is less than a sixth preset threshold, that the RRM measurement manner is the uplink RRM measurement; or determine, when the quantity of neighboring base stations of the base station is less than a seventh preset threshold and the quantity of terminals served by the base station is greater than an eighth preset threshold, that the RRM measurement manner is the downlink RRM measurement.

Referring to other combination manners for the basic parameter in the foregoing embodiment, execution manners are similar, and details are not described herein again.

The apparatus is configured to perform the method embodiment performed by the foregoing base station, and an implementation principle and a technical effect of the apparatus are similar to those of the method embodiment. For related content, refer to the method embodiment. Details are not described herein again.

Figure 8:
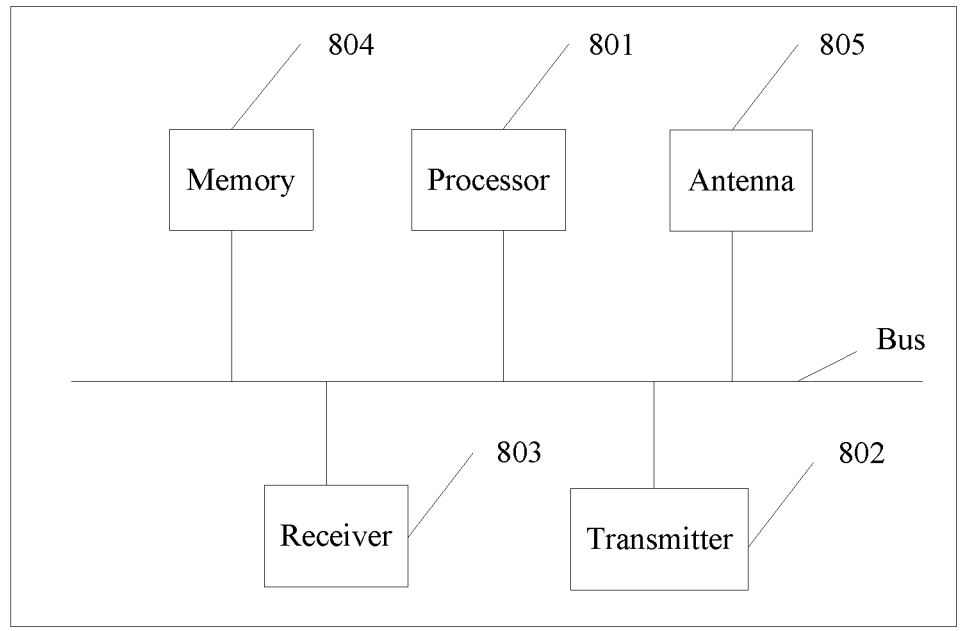
FIG. 8 is a schematic structural diagram of another resource management indication apparatus according to an embodiment of this application.

FIG. 8 is a schematic structural diagram of another resource management indication apparatus according to an embodiment of this application. The apparatus may be integrated into the foregoing terminal. As shown in FIG. 8, the apparatus includes a processor 801, a transmitter 802, and a receiver 803; and optionally, may further include a memory 804 and an antenna 805.

The memory 804, the transmitter 802, the receiver 803, and the processor 801 may be connected by using a bus. Certainly, during actual application, the memory 804, the transmitter 802, the receiver 803, and the processor 801 may not be of a bus structure, but may be of another structure, for example, a star structure. This is not specifically limited in this application.

Optionally, the processor 801 may be specifically a general-purpose central processing unit or an ASIC, may be one or more integrated circuits for controlling program execution, may be a hardware circuit developed by using an FPGA, or may be a baseband processor.

Optionally, the processor 801 may include at least one processing core.

Optionally, the memory 804 may include one or more of a ROM, a RAM, and a magnetic disk memory. The memory 804 is configured to store data and/or an instruction required when the processor 801 runs. There may be one or more memories 804.

The apparatus may be configured to perform any method in the foregoing method embodiments. Specifically, the receiver 803 is configured to receive radio resource management RRM measurement manner indication information sent by a base station. The RRM measurement manner indication information is used to indicate an RRM measurement manner to the terminal.

The processor 801 is configured to perform RRM measurement based on the RRM measurement manner. The RRM measurement manner includes any one or more of the following:

downlink RRM measurement, where the downlink RRM measurement indicates that the terminal performs RRM measurement based on a downlink measurement signal delivered by the base station, and sends a measurement result to the base station; or uplink RRM measurement, where the uplink RRM measurement indicates that the terminal sends an uplink measurement signal to the base station, and the base station performs RRM measurement; or both uplink RRM measurement and downlink RRM measurement being performed; or uplink assisted downlink RRM measurement, where the uplink assisted downlink RRM measurement indicates that the base station adjusts, based on an uplink measurement signal sent by the terminal, sending of a downlink measurement signal, and receives a measurement result reported by the terminal; or downlink assisted uplink RRM measurement, where the downlink assisted uplink RRM measurement indicates that the terminal adjusts, based on a downlink measurement signal sent by the base station, sending of an uplink measurement signal, and the base station performs RRM measurement.

Optionally, the RRM measurement manner indication information is carried in any one of the following messages: radio resource control RRC signaling, a DCI message, a paging message, and a Media Access Control MAC CE message.

Optionally, when the RRM measurement manner is the uplink assisted downlink RRM measurement, the processor 801 sends the uplink measurement signal to the base station by using the transmitter 802, and receives, by using the receiver 803, a downlink measurement signal sent by one or more base stations in a network to which the base station belongs. Then, the processor 801 obtains a downlink measurement result based on the downlink measurement signal, and sends the downlink measurement result to the base station by using the transmitter 802.

Optionally, when the RRM measurement manner is the downlink assisted uplink RRM measurement, the processor 801 is specifically configured to: receive, by using the receiver 803, the downlink measurement signal sent by the base station; and adjust, based on the downlink measurement signal, the sending of the uplink measurement signal.

The apparatus is configured to perform the method embodiment performed by the foregoing terminal, and an implementation principle and a technical effect of the apparatus are similar to those of the method embodiment. For related content, refer to the method embodiment. Details are not described herein again.

Figure 9:
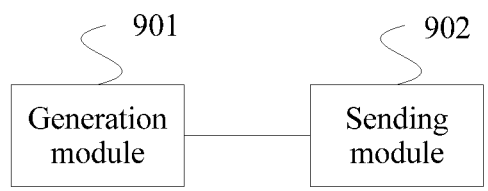
FIG. 9 is a schematic structural diagram of another resource management indication apparatus according to an embodiment of this application.

FIG. 9 is a schematic structural diagram of another resource management indication apparatus according to an embodiment of this application. The apparatus may be integrated into the foregoing base station. As shown in FIG. 9, the apparatus includes a generation module 901 and a sending module 902.

The generation module 901 is configured to generate RRM measurement manner indication information. The RRM measurement manner indication information is used to indicate an RRM measurement manner.

The sending module 902 is configured to send the RRM measurement manner indication information to a terminal.

The RRM measurement manner may be shown in the foregoing embodiments, and details are not described herein again.

Figure 10:
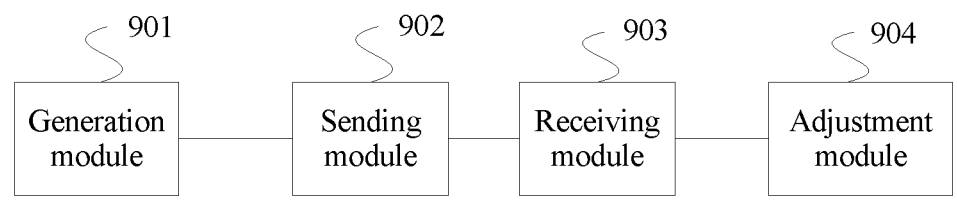
FIG. 10 is a schematic structural diagram of another resource management indication apparatus according to an embodiment of this application.

FIG. 10 is a schematic structural diagram of another resource management indication apparatus according to an embodiment of this application. As shown in FIG. 10, based on FIG. 9, the apparatus further includes a receiving module 903 and an adjustment module 904.

The receiving module 903 is configured to receive an uplink measurement signal sent by the terminal.

The adjustment module 904 is configured to adjust, based on the uplink measurement signal, sending of a downlink measurement signal.

Then, the receiving module 903 receives a downlink measurement result that is measured and sent by the terminal based on the downlink measurement signal and that is sent by the terminal.

Optionally, the adjustment module 904 obtains an uplink measurement result based on the uplink measurement signal; and selects, based on the uplink measurement result, one or more base stations in a network to which the base station belongs, to send the downlink measurement signal to the terminal.

Optionally, when the RRM measurement manner is downlink assisted uplink RRM measurement, the sending module 902 is further configured to send a downlink measurement signal to the terminal, so that the terminal adjusts, based on the downlink measurement signal, sending of an uplink measurement signal. The receiving module 903 receives the uplink measurement signal sent by the terminal, to perform the RRM measurement.

Figure 11:
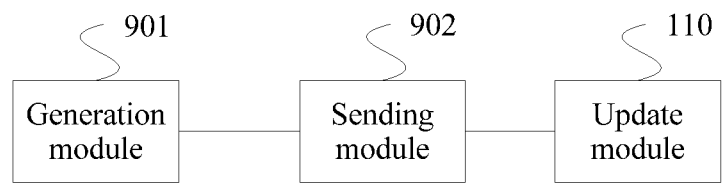
FIG. 11 is a schematic structural diagram of another resource management indication apparatus according to an embodiment of this application.

FIG. 11 is a schematic structural diagram of another resource management indication apparatus according to an embodiment of this application. As shown in FIG. 11, based on FIG. 9, the apparatus may further include an update module 110, configured to: obtain the uplink measurement signal sent by the terminal, and determine an updated RRM measurement manner based on the uplink measurement signal.

Correspondingly, the sending module 902 is further configured to send updated RRM measurement manner indication information to the terminal. The updated RRM measurement manner indication information is used to indicate the updated RRM measurement manner.

In another implementation, the update module 110 obtains a downlink measurement result sent by the terminal based on the downlink measurement signal, and determines an updated RRM measurement manner based on the downlink measurement result.

Correspondingly, the sending module 902 is further configured to send updated RRM measurement manner indication information to the terminal. The updated RRM measurement manner indication information is used to indicate the updated RRM measurement manner.

Further, the generation module 901 is specifically configured to: determine, when a basic parameter satisfies a preset condition, an RRM measurement manner corresponding to the preset condition; and generate the RRM measurement manner indication information based on the RRM measurement manner.

For the basic parameter, refer to the foregoing method embodiments. Details are not described herein again.

When the basic parameter includes a quantity of neighboring base stations of the base station and a quantity of base stations in a cell in which the base station is located, the generation module 901 is specifically configured to: determine, when the quantity of neighboring base stations of the base station is greater than a first preset threshold or the quantity of base stations in the cell in which the base station is located is greater than a second preset threshold, that the RRM measurement manner is the uplink RRM measurement; or determine, when the quantity of neighboring base stations of the base station is less than a third preset threshold or the quantity of base stations in the cell in which the base station is located is less than a fourth preset threshold, that the RRM measurement manner is the downlink RRM measurement.

When the basic parameter includes a quantity of neighboring base stations of the base station and a quantity of terminals served by the base station, the generation module

901 is specifically configured to: determine, when the quantity of neighboring base stations of the base station is greater than a fifth preset threshold and the quantity of terminals served by the base station is less than a sixth preset threshold, that the RRM measurement manner is the uplink RRM measurement; or determine, when the quantity of neighboring base stations of the base station is less than a seventh preset threshold and the quantity of terminals served by the base station is greater than an eighth preset threshold, that the RRM measurement manner is the downlink RRM measurement.

The apparatus is configured to perform the method embodiment performed by the foregoing base station, and an implementation principle and a technical effect of the apparatus are similar to those of the method embodiment. For related content, refer to the method embodiment. Details are not described herein again.

Figure 12:
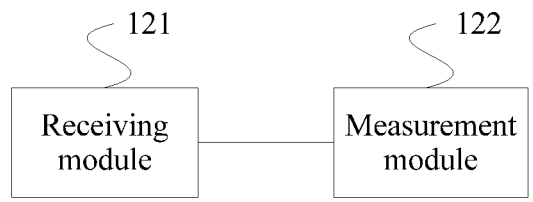
FIG. 12 is a schematic structural diagram of another resource management indication apparatus according to an embodiment of this application.

FIG. 12 is a schematic structural diagram of another resource management indication apparatus according to an embodiment of this application. The apparatus may be integrated into the foregoing terminal. As shown in FIG. 12, the apparatus includes a receiving module 121 and a measurement module 122.

The receiving module 121 is configured to receive radio resource management RRM measurement manner indication information sent by a base station. The RRM measurement manner indication information is used to indicate an RRM measurement manner to the terminal.

The measurement module 122 is configured to perform RRM measurement based on the RRM measurement manner.

The RRM measurement manner may be shown in the foregoing embodiments, and details are not described herein again.

Optionally, when the RRM measurement manner is uplink assisted downlink RRM measurement, the measurement module 122 sends an uplink measurement signal to the base station, and receives a downlink measurement signal sent by one or more base stations in a network to which the base station belongs; and obtains a downlink measurement result based on the downlink measurement signal, and sends the downlink measurement result to the base station.

Optionally, when the RRM measurement manner is downlink assisted uplink RRM measurement, the measurement module 122 receives a downlink measurement signal sent by the base station; and adjusts, based on the downlink measurement signal, sending of an uplink measurement signal.

The apparatus is configured to perform the method embodiment performed by the foregoing terminal, and an implementation principle and a technical effect of the apparatus are similar to those of the method embodiment. For related content, refer to the method embodiment. Details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (English: processor) to perform some of the steps of the methods described in the embodiments of this application. The foregoing storage medium includes any medium that can store program code, such as a USB flash drive, a removable hard disk, a read-only memory (English: Read-Only Memory, ROM), a random access memory (English: Random Access Memory, RAM), a magnetic disk, or an optical disc.

What is claimed is:

1. A method of radio resource management (RRM) indication and measurement, comprising:
    generating, by a base station, RRM measurement manner indication information used to indicate an RRM measurement manner; and
    sending, by the base station to a terminal, the RRM measurement manner indication information, wherein the RRM measurement manner comprises one or more of the following:
        uplink assisted downlink RRM measurement to indicate that the base station adjusts, based on an uplink measurement signal from the terminal, sending of a downlink measurement signal, and receives a measurement result reported by the terminal; and
        downlink assisted uplink RRM measurement to indicate that the terminal adjusts, based on a downlink measurement signal from the base station, sending of an uplink measurement signal, and the base station performs RRM measurement,
    wherein:
    in response to the RRM measurement manner being the uplink assisted downlink RRM measurement, the method further comprises:
        receiving, by the base station, the uplink measurement signal from the terminal;
        adjusting, by the base station based on the uplink measurement signal, the sending of the downlink measurement signal, wherein the adjusting includes adjusting a sending period of the downlink measurement signal or adjusting a base station that sends the downlink measurement signal to the terminal; and
        receiving, by the base station, the downlink measurement result that is obtained by the terminal through measurement based on the downlink measurement signal and that is from the terminal.

2. The method according to claim 1, wherein the RRM measurement manner indication information is carried in any one of the following messages:
 radio resource control RRC signaling, a downlink control information DCI message, a paging message, and a Media Access Control MAC control element CE message.

3. The method according to claim 1, wherein the adjusting, by the base station based on the uplink measurement signal, the sending of the downlink measurement signal comprises:
 obtaining, by the base station, an uplink measurement result based on the uplink measurement signal; and
 selecting, by the base station based on the uplink measurement result, one or more base stations in a network to which the base station belongs, to send the downlink measurement signal to the terminal.

4. The method according to claim 1, wherein in response to the RRM measurement manner being the downlink assisted uplink RRM measurement, the method further comprises:
 sending, by the base station, the downlink measurement signal to the terminal, so that the terminal adjusts, based on the downlink measurement signal, the sending of the uplink measurement signal, wherein the downlink measurement signal is used to adjust a sending period of the uplink measurement signal; and
 receiving, by the base station, the uplink measurement signal from the terminal, to perform the RRM measurement, wherein the uplink measurement signal is sent by the terminal in an adjusted manner.

5. The method according to claim 1, wherein the method further comprises:
 obtaining, by the base station, the uplink measurement signal from the terminal, and determining an updated RRM measurement manner based on the uplink measurement signal; and
 sending, by the base station, updated RRM measurement manner indication information to the terminal, wherein the updated RRM measurement manner indication information is used to indicate the updated RRM measurement manner.

6. The method according to claim 1, wherein the method further comprises:
 obtaining, by the base station, a downlink measurement result from the terminal based on the downlink measurement signal, and determining an updated RRM measurement manner based on the downlink measurement result; and
 sending, by the base station, updated RRM measurement manner indication information to the terminal, wherein the updated RRM measurement manner indication information is used to indicate the updated RRM measurement manner.

7. The method according to claim 1, wherein the generating, by a base station, radio resource management RRM measurement manner indication information comprises:
 determining, by the base station when a basic parameter satisfies a preset condition, an RRM measurement manner corresponding to the preset condition; and
 generating, by the base station, the RRM measurement manner indication information based on the RRM measurement manner.

8. The method according to claim 7, wherein the basic parameter comprises one or a combination of a plurality of the following:
 a quantity of neighboring base stations of the base station;
 a quantity of base stations in a cell in which the base station is located;
 a quantity of terminals served by the base station;
 a quantity of terminals in an active state that are served by the base station;
 a period in which a terminal served by the base station sends an uplink measurement signal; or
 a measurement result determined by the base station based on an uplink measurement signal from a terminal.

9. The method according to claim 1, further comprising:
 dynamically adjusting the RRM measurement manner from uplink assisted downlink RRM measurement to downlink assisted uplink RRM measurement or from downlink assisted uplink RRM measurement to uplink assisted downlink RRM measurement.

10. A method of radio resource management (RRM) indication and measurement, comprising:
 receiving, by a terminal from a base station, RRM measurement manner indication information used to indicate an RRM measurement manner to the terminal; and
 performing, by the terminal, RRM measurement based on the RRM measurement manner, wherein the RRM measurement manner comprises one or more of the following:
 uplink assisted downlink RRM measurement to indicate that the base station adjusts, based on an uplink measurement signal from the terminal, sending of a downlink measurement signal, and receives a measurement result reported by the terminal; and
 downlink assisted uplink RRM measurement to indicate that the terminal adjusts, based on a downlink measurement signal from the base station, sending of an uplink measurement signal, and the base station performs RRM measurement,
 wherein in response to the RRM measurement manner being the uplink assisted downlink RRM measurement, the method further comprises:
 sending, by the terminal, the uplink measurement signal to the base station, wherein the uplink measurement signal is used to adjust a sending period of a downlink measurement signal, or the uplink measurement signal is used to adjust one or more base stations in a network to which the base station belongs that sends the downlink measurement signal;
 receiving a downlink measurement signal from one or more base stations in a network to which the base station belongs; and
 obtaining, by the terminal, a downlink measurement result based on the downlink measurement signal, and sending the downlink measurement result to the base station.

11. The method according to claim 10, wherein the RRM measurement manner indication information is carried in any one of the following messages:
 radio resource control RRC signaling, a DCI message, a paging message, and a Media Access Control MAC CE message.

12. The method according to claim 10, wherein in response to the RRM measurement manner being the downlink assisted uplink RRM measurement, the performing, by the terminal, RRM measurement based on the RRM measurement manner comprises:
 receiving, by the terminal, the downlink measurement signal from the base station; and adjusting, by the terminal based on the downlink measurement signal, the sending of the uplink measurement signal, wherein the adjusting includes adjusting a sending period of the uplink measurement signal, or adjusting the base stations to which the uplink measurement signal is sent.

13. The method according to claim 10, further comprising:
dynamically adjusting the RRM measurement manner from uplink assisted downlink RRM measurement to downlink assisted uplink RRM measurement or from downlink assisted uplink RRM measurement to uplink assisted downlink RRM measurement.

14. A radio resource management (RRM) indication and measurement apparatus, comprising:
a processor, configured to generate RRM measurement manner indication information used to indicate an RRM measurement manner; and
a transmitter, configured to send to a terminal the RRM measurement manner indication information, wherein the RRM measurement manner comprises one or more of the following:
uplink assisted downlink RRM measurement to indicate that the base station adjusts, based on an uplink measurement signal from the terminal, sending of a downlink measurement signal, and receives a measurement result reported by the terminal; and
downlink assisted uplink RRM measurement to indicate that the terminal adjusts, based on a downlink measurement signal from the base station, sending of an uplink measurement signal, and the base station performs RRM measurement,
wherein the apparatus further comprises a receiver and wherein in response to the RRM measurement manner being the uplink assisted downlink RRM measurement, the receiver is configured to receive the uplink measurement signal from the terminal;
the processor is configured to adjust, based on the uplink measurement signal, the sending of the downlink measurement signal, wherein the adjust includes adjusting a sending period of the downlink measurement signal or adjusting a base station that sends the downlink measurement signal to the terminal; and
the receiver is further configured to receive the downlink measurement result that is obtained by the terminal through measurement based on the downlink measurement signal and that is from the terminal.

15. The apparatus according to claim 14, wherein the RRM measurement manner indication information may be carried in any one of the following messages:
radio resource control RRC signaling, a downlink control information DCI message, a paging message, and a Media Access Control MAC control element CE message.

16. The apparatus according to claim 14, further comprising:
dynamically adjust the RRM measurement manner from uplink assisted downlink RRM measurement to downlink assisted uplink RRM measurement or from downlink assisted uplink RRM measurement to uplink assisted downlink RRM measurement.

17. A radio resource management (RRM) indication and measurement apparatus, comprising:
a receiver, configured to receive from a base station RRM measurement manner indication information used to indicate an RRM measurement manner to the apparatus; and
a processor, configured to perform RRM measurement based on the RRM measurement manner, wherein the RRM measurement manner comprises any one or more of the following:
uplink assisted downlink RRM measurement to indicate that the base station adjusts, based on an uplink measurement signal from a terminal, sending of a downlink measurement signal, and receives a measurement result reported by the terminal; and
downlink assisted uplink RRM measurement to indicate that the terminal adjusts, based on a downlink measurement signal from the base station, sending of an uplink measurement signal, and the base station performs RRM measurement,
wherein in response to the RRM measurement manner being the uplink assisted downlink RRM measurement, the perform the RRM measurement based on the RRM measurement manner comprises:
send the uplink measurement signal to the base station, wherein the uplink measurement signal is used to adjust a sending period of a downlink measurement signal, or the uplink measurement signal is used to adjust one or more base stations in a network to which the base station belongs that sends the downlink measurement signal;
receive a downlink measurement signal from one or more base stations in a network to which the base station belongs; and
obtain a downlink measurement result based on the downlink measurement signal, and sending the downlink measurement result to the base station.

18. The apparatus according to claim 17, wherein the RRM measurement manner indication information is carried in any one of the following messages:
radio resource control RRC signaling, a DCI message, a paging message, and a Media Access Control MAC CE message.

19. The apparatus according to claim 17, wherein when the RRM measurement manner is the downlink assisted uplink RRM measurement,
the processor is configured to: receive, by using the receiver, the downlink measurement signal from the base station; and adjust, based on the downlink measurement signal, the sending of the uplink measurement signal.

20. The apparatus according to claim 17, further comprising:
dynamically adjust the RRM measurement manner from uplink assisted downlink RRM measurement to downlink assisted uplink RRM measurement or from downlink assisted uplink RRM measurement to uplink assisted downlink RRM measurement.

* * * * *

UNITED STATES PATENT AND TRADEMARK OFFICE
CERTIFICATE OF CORRECTION

| | |
|---|---|
| PATENT NO. | : 10,827,374 B2 |
| APPLICATION NO. | : 16/366679 |
| DATED | : November 3, 2020 |
| INVENTOR(S) | : Luo et al. |

Page 1 of 1

It is certified that error appears in the above-identified patent and that said Letters Patent is hereby corrected as shown below:

In the Claims

Claim 17: Column 32, Line 9: "RRM measurement manner comprises any one or more" should read -- RRM measurement manner comprises one or more --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*